US006643554B2

(12) United States Patent
Gough, Jr. et al.

(10) Patent No.: US 6,643,554 B2
(45) Date of Patent: Nov. 4, 2003

(54) METHOD AND APPARATUS FOR ADAPTIVE CONTROL OF MARGINALLY STABLE SYSTEMS

(75) Inventors: William Albert Gordon Gough, Jr., Surrey (CA); Sava Kovac, Burnaby (CA); Mihai Huzmezan, Vancouver (CA)

(73) Assignee: Universal Dynamics Technologies Inc. (CA)

( * ) Notice: Subject to any disclaimer, the term of this patent is extended or adjusted under 35 U.S.C. 154(b) by 385 days.

(21) Appl. No.: 09/736,636

(22) Filed: Dec. 14, 2000

(65) Prior Publication Data

US 2003/0028263 A1 Feb. 6, 2003

Related U.S. Application Data

(60) Provisional application No. 60/173,978, filed on Dec. 30, 1999.

(51) Int. Cl.$^7$ .............................................. G05B 13/02
(52) U.S. Cl. ............................. 700/28; 700/29; 700/42
(58) Field of Search ................................ 700/28, 29, 42

(56) References Cited

U.S. PATENT DOCUMENTS 5,394,322 A * 2/1995 Hansen ........................ 700/37
6,459,939 B1 * 10/2002 Hugo ........................... 700/44

* cited by examiner

*Primary Examiner*—John Follansbee
*Assistant Examiner*—Thomas Pham
(74) *Attorney, Agent, or Firm*—Greer, Burns & Crain, Ltd.

(57) ABSTRACT

The present invention provides a method and apparatus for adaptive control which models marginally stable systems by creating a reference or disturbance model to account for the slope of the process variable being constant for different control inputs to the process.

12 Claims, 4 Drawing Sheets

METHOD AND APPARATUS FOR ADAPTIVE CONTROL OF MARGINALLY STABLE SYSTEMS

CROSS-REFERENCE TO RELATED APPLICATION

This application claims the benefit under 35 USC 119(e) of U.S. Provisional Patent Application No. 60/173,978 filed Dec. 30, 1999.

FIELD OF THE INVENTION

The application relates to the field of process control engineering, and more particularly adaptive process control.

BACKGROUND OF THE INVENTION

The present applicant's previous U.S. Pat. No. 5,335,164 issued Aug. 2, 1994 and U.S. Pat. No. 5,687,077 issued Nov. 11, 1997, the contents of which are incorporated herein by reference, disclose methods and apparatus for adaptive control which use orthonormal Laguerre functions to model the process to be controlled. Such methods have proven useful for modelling and controlling inherently stable systems which eventually settle at a steady state, also referred to as self-regulating systems. However these methods are not suitable for "marginally stable" or unstable systems. A "marginally stable" system is a system which is only stable for a certain control input. An unstable system is one which cannot be made stable by any control input. An example of a marginally stable system is a leaky water tank. A control input which matches the rate of leakage results in a stable system, but an input greater or less than the rate of leakage results in either emptying or overflow of the tank. Obviously many important systems, such as those involving an energy input such as heat to a system, are marginally stable. Previous methods have difficulty modelling marginally stable systems because such systems have a process value y which goes to zero or infinity at every control input except the stable control input. For example, conventional Proportional-Integral-Derivative (PID) based loop controllers have difficulty controlling processes that involve the heating and cooling of a closed batch reactor.

There is therefore a need for a method of adaptive control which can model and control marginally stable systems.

SUMMARY OF THE INVENTION

The present invention provides a method and apparatus for adaptive control which models marginally stable systems by creating a reference or disturbance model to account for a constant slope of the process variable for different valves of the control input.

BRIEF DESCRIPTION OF THE DRAWING

In drawings illustrating a preferred embodiment of the invention.

DETAILED DESCRIPTION OF THE PREFERRED EMBODIMENT

The present invention also uses Laguerre orthonormal functions to describe process dynamics as disclosed in the applicant's previous U.S. Pat. No. 5,335,164 issued Aug. 2, 1994 and U.S. Pat. No. 5,687,077 issued Nov. 11, 1997, the contents of which are incorporated herein by reference. The Laguerre function, a complete orthonormal set in $L_2$, has the following Laplace domain representation:

$$L_i(s) = \sqrt{2p}\,\frac{(s-p)^{i-1}}{(s+p)^i}, \; i = 1, \ldots, N$$

where
i is the number of Laguerre filters (i=1, N)
p>0 is the time scale; and
$L_i(x)$ are the Laguerre polynomials.

The reason for using the Laplace domain is the simplicity of representing the Laguerre ladder network, which can be expressed as a stable, observable and controllable state space form as:

$$l(k+1)=Al(k)+bu(k)$$
$$y(k)=c^T l(k)$$

where
$l(k)^T=[l_1(k), \ldots, l_N(k)]^T$ is the state of the ladder
$C_k^T(k)=[c_1(k), \ldots, c_N(k)]$ are the Laguerre coefficients at time k;
A is a lower triangular square (N×N) matrix.

The Laguerre coefficients represent a projection of that plant model onto a linear space whose basis is formed by an orthonormal set of Laguerre functions. This form is suitable to represent stable systems but not marginally stable systems. One approach was to factor the plant into its stable and marginally stable part, considered known. The same procedure can be applied to a plant that contains well-known unstable dynamics. The robustness of the identification method is conditioned by the exact knowledge of the marginally stable or unstable part. The same concept used in the plant identification can be used to identify the process load (output disturbance). In this case the major difference is that the controller does not have access to the disturbance model input. This issue is addressed in a stochastic manner that provides an estimate of the load. The development is based on the observation that an external white noise feeds the disturbance model, resulting in a colored signal. This signal can be estimated as the difference between plant process variable increment and the estimated plant model with the integrator removed. The present invention uses the plant and disturbance models.

Figure 1:
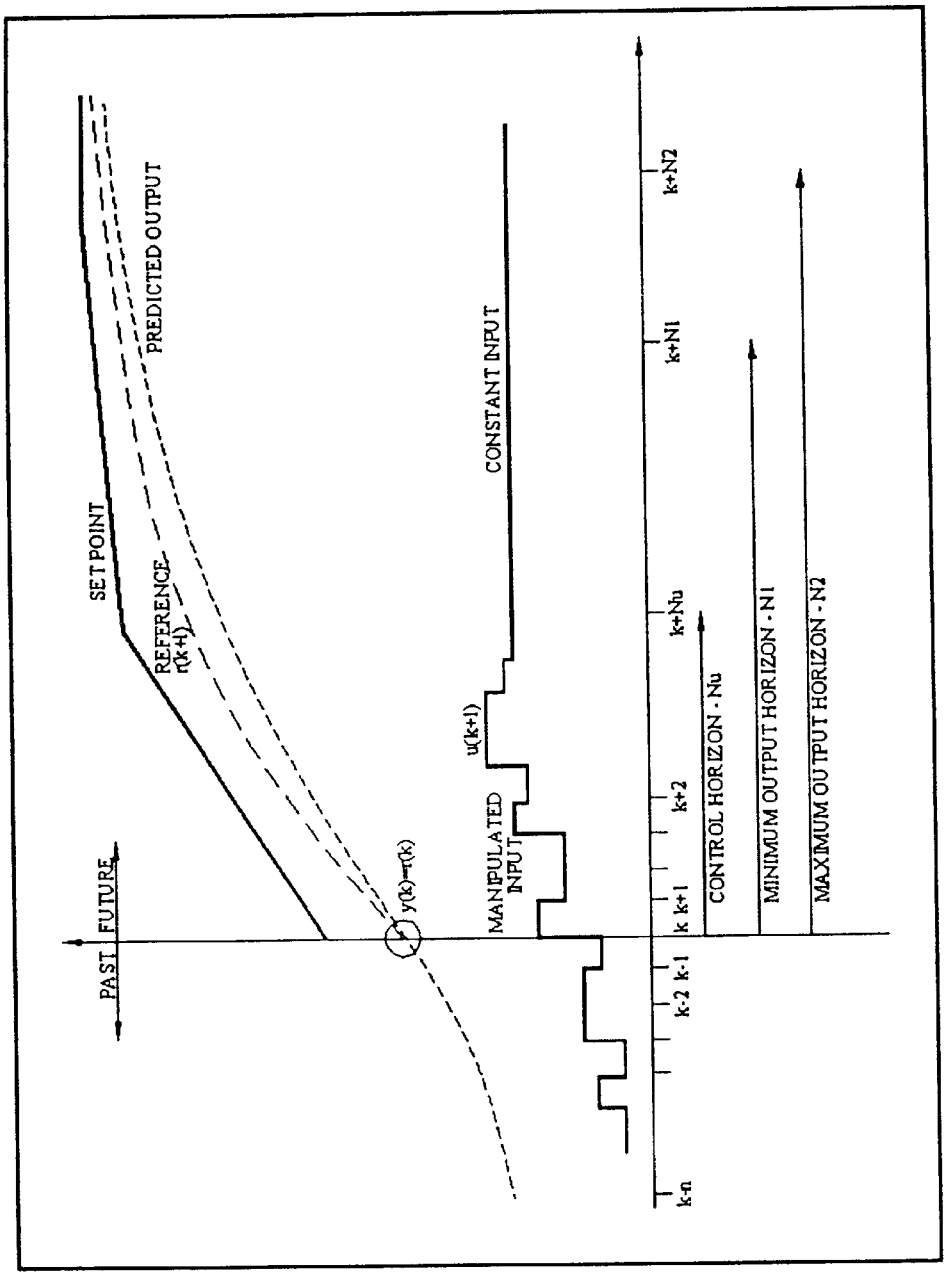
FIG. 1 is a chart illustrating the operation of an adaptive controller according to the invention.

The concept of predicted control involves the repeated optimization of a performance objective over a finite horizon extending from a future time ($N_1$) up to a prediction horizon ($N_2$). FIG. 1 characterizes the way prediction is used within the present control strategy. Given a set point s(k+l), a reference r(k+l) is produced by pre-filtering and is used within the optimization of the control cost function. Manipulating the control variable u(k+l) over the control horizon ($N_u$), the algorithm drives the predicted output y(k+l) over the prediction horizon towards the reference.

A simplified algorithm to implement the invention is as follows. The minimum variance control is characterized by the fact that the $N_2$ steps ahead output prediction ($y(k+N_2)$) is assumed to have reached the reference trajectory value $y_r(k+N_2)$. In other words $$y_r(k+N_2)=y(k+N_2)=y(k)+y_d(k+N_1)+y_{fl}(k+N_2)+C_k^T(l(k+N_2)-l(k))$$

Making an essential assumption that the future command stays unchanged: $u(k+1)= \ldots =u(k+N_2)$, then the $N_2$ steps ahead predictor becomes:

$$y(k+N_2)=y(k)+k^T l(k)+k_d^T l_d(k)+k_{ff} l_{ff}(k)+\beta_d u_d(k)+\beta_{ff} u_{ff}(k)+\beta u(k)$$
$$k_{ff} l_{ff}(k)+\beta_d u_d(k)+\beta_{ff} u_{ff}(k)+\beta u(k)$$

where
$$k^T = C_k(A^{N_2}-I)$$
$$k_d^T = C_d(A_d^{N_2}-I)$$
$$k_{ff}^T = C_{ff}(A_{ff}^{N_2}-I)$$
$$\beta = C_k^T(A^{N_2}+\Lambda+I)b$$
$$\beta_d = C_d^T(A_d^{N_2}+\Lambda+I)b_d$$
$$\beta_{ff} = C_{ff}^T(A_{ff}^{N_2}+\Lambda+I)b_{ff}$$

Here $u(k)$ is unknown, $u_d(k)$ (the estimated disturbance model input) is estimated and $u_{ff}(k)$ (measured disturbance model input) is measured, $\beta_*$ is the sum of the first $N_2$ parameters of each corresponding system (i.e. plant, stochastic disturbance and deterministic disturbance, respectively).

It is obvious from the above definitions that if a designer is not looking beyond the dead time of the system, $\beta_*$ is zero. One must choose $N_2$ such that $\beta$ is of the same sign as the process static gain and of sufficiently large amplitude. A possible criterion to be satisfied when choosing the horizon $N_2$ is:

$$\beta \operatorname{sign}(C_k^T(I-A)^{-1}\underline{b}) \geq \epsilon |C_K^T(I-A)^{-1}b|$$

with $\epsilon=0.5$. In the simple case of a minimum variance controller the matrix $(I-A)^{-1}b$ can be computed off-line as it depends only on the Laguerre filters. Additional computation has to be carried out on-line since the identified models (i.e. their Laguerre coefficients: $C_k$, $C_{ff}$, and $C_d$) are changing. As shown in FIG. 1, a first order reference trajectory filter can be employed to define the $N_2$ steps ahead set point for the predictive controller ($y_r(k+N_2)$):

$$y_r(k+N_2)=\alpha^{N_2}y(k)+(1-\alpha^{N_2})y_{sp})$$

The required control input $u(k)$ is therefore expressed as:

$$u(k)=\beta^{-1}(y_r(k+N_2)-(y(k)+k^T l(k)+k_d^T l_d(k)+K_{ff} l_{ff}(k)+\beta_d u_d(k)+\beta_{ff} u_{ff}(k)))$$

A) The Preferred Integrating Control Algorithm

The preferred algorithm for the invention is as follows (where "BWC" refers to the controller of the invention, and a subscripted variable $A_B$ is written A_B).

The TIME for Control Action in the case of the BWC integrating version:

1. Read the process input (CV_PROCESS(k)), process output (PV_PROCESS(k)), process measured disturbance (FFX_PROCESS(k)) and the set-point SET_POINT(k). Here X stands for various disturbances (1–3) and k for the sample time.

2. Scaling of the process input (CV_PROCESS(k)), process output (PV_PROCESS(k)), process measured disturbance (FFX_PROCESS(k)) to internal variables corresponding for process input (CV(k)), process output (PV(k)) and process measured disturbances (FFX(k)), respectively. This procedure is necessary to bring the controlled process into a range of control movements and internal gains that will maximize the accuracy of the identification algorithm and the precision of the control method. The chosen scaling is described in the following sub-procedure.

---

BWC_INTERNAL_GAIN = 0.06
Read the LEARNING_RATE
Read the PLANT_GAIN
DECISION_VARIABLE = PLANT_GAIN/BWC_INTERNAL_GAIN
If DECISION_VARIABLE > 1 then
    CV_NORMALIZATION = PLANT_GAIN/
                            BWC_INTERNAL_GAIN
                            PV_NORMALIZATION = 1
Else
    PV_NORMALIZATION = PLANT_GAIN/
                              BWC_INTERNAL_GAIN
                            CV_NORMALIZATION = 1
Read CV_RANGE_MAX_RAW, CV_RANGE_MIN_RAW
CV(k) = LEARNING_RATE*CV_NORMALIZATION*
    (CV_PROCESS(k) − CV_RANGE_MIN_RAW)/
    (CV_RANGE_MAX_RAW − CV_RANGE_MIN_RAW)
PV(k) = LEARNING_RATE*PV_NORMALIZATION*
    (PV_PROCESS(k) − PV_RANGE_MIN_RAW)/
    (PV_RANGE_MAX_RAW −
    PV_RANGE_MIN_RAW)
FFX(k) = LEARNING_RATE*FFX_NORMALIZATION*
    (FFX_PROCESS(k) − FFX_RANGE_MIN_RAW)/
    (FFX_RANGE_MAX_RAW −
    FFX_RANGE_MIN_RAW)
Procedure return

---

3. When the controller is just enabled or reset flag is raised then:

A: Read the following tuning parameters from the configuration file:

| | | |
|---|---|---|
| MIN_BETA | 0.001 | Minimum Beta - Used for model reloading |
| SP_FILTER | 100 | SP Filtering in (Range 0–100, 100–No filtering) |
| INT_GAIN | 0.2 | Sum Cancel parameter gain |
| RLS_LAMBDA | 0.99 | RlsLambda - Recursive Least Square Parameter |
| RLS_ALPHA | 0.5 | RlsAlpha - Recursive Least Square Parameter |
| RLS_BETA | 0.005 | RlsBeta - Recursive Least Square Parameter |
| RLS_DELTA | 0.005 | RlsDelta - Recursive Least Square Parameter |
| PK_DIAG | 10 | Initial PK covariance matrix, with a diagonal structure |
| INTEG_LEARN_FACTOR | 1 | Integrating Learning Factor (1–20) |
| SLOPE_LIMIT | 0.05 | Steady State Slope Limit |
| SUM_CANCEL_COUNTER | 30 | Number of updates after the set-point change has occurred |
| DIST_FILTER_LENGTH | 50 | Number of samples used within the filter |

B. Compute the state space form of the orthonormal Laguerre network: A, B, C(k), A_FFX, B_FFX, C_FFX(k), A_STS, B_STS, C_STS(k) (see U.S. Pat. No. 5,685,077 from Nov. 11, 1997).
    C(k), C_FFX(k), C_STS(k) is calculated as follows:
        loaded from previously saved model; or
        loaded from initial model;
        initialized to [0,0,0, . . . 0]

C. Compute the control related matrices SB, SA, SS, K, SB_FFX, SA_FFX, SS_FFX, K_FFX, SB_STS, SA_STS, SS_STS, K_STS (see U.S. Pat. No. 5,685,077).

D. Initialize C_M(k) with C(k), C_M_STS(k) with C_STS(k) and C_M_FFX(k) with C_FFX(k).

E. Clear the state vector L(k), L_FFX(k), L_STS(k) used during control.

F. Update the models states as follows:

$$L(k) = A*L(k-1) + B(k)*CV(k-1)$$

$$L\_FFX(k) = A\_FFX*L\_FFX(k-1) + B\_FFX*FFX(k-1)$$

$$L\_STS(k) = A\_STS*L\_STS(k-1) + B\_STS*DV(k-1)$$

A, A_FFX, A_STS represent the state and B, B_FFX, B_STS the input matrices of the corresponding state space representation of the Laguerre networks generated for the same pole but different number of filters if required.

G. The model output estimations are calculated:

$$Y\_EST(k) = Y\_EST(k-1) + C(k)*L(k)$$

$$Y\_EST\_FFX(k) = Y\_EST\_FFX(k-1) + C\_FFX(k)*L\_FFX(k)$$

$$Y\_EST\_STS(k) = Y\_EST\_STS(k-1) + C\_STS(k)*L\_STS(k)$$

H. The input of the unknown disturbance model is updated:

$$DV(k)=(Y\_EST(k)+Y\_EST\_FFX(k)+Y\_EST\_STS(k))-PV(k)$$

I. Steps F. to H. are iterated for a number of times (i.e. preferably at least 140) for the convergence of the state estimators. The computation of the input to the unknown disturbance model is also iterated for convergence purposes.

J. Computation of the prediction parameter gain $$BETA(k)=C(k)*SB(k)$$

K. If BETA(k)<MIN_BETA then the controller stops its activity.

L. Procedure return

4. During normal controller operation the following computations are mandatory in order to produce CV(k)

A. Update the models states as follows:

$$L(k) = A*L(k-1) + B*CV(k-1)$$

$$L\_FFX(k) = A\_FFX*L\_FFX(k-1) + B\_FFX*FFX(k-1)$$

$$L\_STS(k) = A\_STS*L\_STS(k-1) + B\_STS*DV(k-1)$$

A, A_FFX, A_STS, represent the state and B, B_FFX, B_STS the input matrices of the corresponding state space representation of the Laguerre networks generated for the same pole but different number of filters if required.

B. The model output estimations are re-calculated:

$$Y\_EST(k) = Y\_EST(k-1) + C(k)*L(k)$$

$$Y\_EST\_FFX(k) = Y\_EST\_FFX(k-1) + C\_FFX(k)*L\_FFX(k)$$

$$Y\_EST\_STS(k) = Y\_EST\_STS(k-1) + C\_STS(k)*L\_STS(k)$$

C. The input of the unknown disturbance model is updated based on the following formula:

$$DV(k)=(Y\_EST(k)+Y\_EST\_FFX(k)+Y\_EST\_STS(k))-PV(k)$$

D. BETA(k)=C(k)*SB(k)

E. The set-point is filtered into a reference using the following digital filter:

$$Y\_R(k)=(1-0.01*SP\_FILTER)*Y\_R(k-1)+0.01*SP\_FILTER*SET\_POINT(k)$$

F. Now all the ingredients for the CV(k) calculation are available:

$$CV(k) = BETA(k)^{-1} * (Y\_R(k) - PV(k) - (C(k) + SA*L(k)) -$$
$$(C\_STS(k)*SS*DV(k) + C\_STS(k)*SA\_STS*L\_STS(k)) -$$
$$(C\_FFX(k)*SS*DV(k) + C\_FFX(k)*SA\_FFX*L\_FFX(k))$$

G. INT_SUM(k)=INT_SUM(k-1)+DIST_FILTER_PAR*INT_GAIN*(Y_R(k)-PV(k))

The use of this integrator is required since based on the internal model principle, the plant model has to be augmented with the dynamics of the disturbance or reference signal (in this case a ramp) such as to ensure a robust, zero error, tracking of a given reference.

A conventional predictive controller that will omit this augmentation will exhibit small errors. It is important to weight the influence of this integrator in the final CV(k) since a different behavior of the controller is expected in the case of set-point changes than disturbance rejection.

$$DIST\_FILTER\_PAR=(DIST\_FILTER\_LENGTH-SUM\_CANCEL\_COUNTER)/DIST\_FILTER\_LENGTH^5$$

The integrator is actually an integrator plus a "nonlinear lag", the DIST_FILTER_PAR being the time constant of this filter. The variable DIST_FILTER_LENGTH represents the non-linearity introduced such as to account for a specific number of updates following the set-point change.

H. CV(k)=CV(k)+INT_SUM(k)

5. The scaling of controller internal variable CV(k) into controller output CV_PROCESS(k) involves a reverse computation based on the same scaling factors as in the step No. 2:

$$CV\_PROCESS(k) = (CV(k)/LEARNING\_RATE/$$
$$CV\_NORMALIZATION)*$$
$$CV\_RANGE\_MAX\_RAW -$$
$$CV\_RANGE\_MIN\_RAW) +$$
$$CV\_RANGE\_MIN\_RAW$$

B) Modeling of Integrating Processes

The controller of the invention checks the following conditions in order to perform the identification of the process model:

1) the modeling flag is enabled
2) the PV(k), FFX(k) are within the learning ranges specified in the data conditioner and the algorithm has detected a SET_POINT(k) change in "auto mode" or CV(k) change in "manual mode" greater than a given SET_POINT THRESHOLD and CV_THRESHOLD, respectively.

The following steps are required to produce an accurate plant model based on Laguerre orthonormal basis functions identification:

- Checking for the pair of inputs for the plant model and known disturbance models as well as the output that characterizes the plant equilibrium around a given set-point.
- A least squares algorithm based on past and current data PV(k−15),PV(k−14), . . . ,PV(k) is employed to estimate the slope (SLOPE(k)) of the process variable.
- Based on this estimate while SLOPE(k) it is greater than SLOPE_LIMIT then the controller will postpone the plant identification until this condition is met.
- If SLOPE (K) is less than SLOPE_LIMIT the plant is assumed to be in equilibrium. CV_SS, FFX_SS are then considered as the equilibrium inputs to the plant and known disturbance models, respectively, at the moment when learning was started.
- The update of the state estimate for the plant and known disturbance models, respectively, is:

$$L\_M(k) = A * L\_M(k-1) + B * (CV(k-1) - CV\_SS)$$
$$L\_M\_FFX(k) = A\_FFX * L\_M\_FFX(k-1) + B\_FFX * (FFX(k-1) - FFX\_SS)$$

Note as well that the variables written in (k−1) are determined at the previous sample time. For instance CV(k−1) was previously determined and since the new CV(k) is not yet available the value used in computation of the state update is CV(k−1).

The MODEL_ERROR calculation:

$$PREDICTED\_DELTA\_PV(k) = C\_M(k-1) * L\_M(k) + C\_M\_FFX(k-1) * L\_M\_FFX(k) + C\_M\_STS(k-1) * L\_M\_STS(k)$$
$$ACTUAL\_DELTA\_PV(k) = PV(k) - PV(k-1)$$
$$MODEL\_ERROR(k) = ACTUAL\_DELTA\_PV(k) - PREDICTED\_DELTA\_PV(k)$$

The covariance matrix update P(k) and P_FFX(k) for the plant and known disturbance models, respectively:

$$P(k) = P(k-1)/RLS\_LAMBDA - (RLS\_ALPHA * P(k-1) * L\_M(k)) * L\_M(k)^T * P(k-1))/(RLS\_LAMBDA * (RLS\_LAMBDA + L\_M(k)^T * P(k-1) * L\_M(k))) + RLS\_BETA * I + RLS\_DELTA * P(k-1) * P(k-1)$$

$$P\_FFX(k) = P\_FFX(k-1)/RLS\_LAMBDA - (RLS\_ALPHA * P\_FFX(k-1) * L\_M\_FFX(k)) * L\_M\_FFX(k)^T * P\_FFX(k-1))/(RLS\_LAMBDA * (RLS\_LAMBDA + L\_M\_FFX(k)^T * P\_FFX(k-1) * L\_M\_FFX(k))) + RLS\_BETA * I + RLS\_DELTA * P\_FFX(k-1) * P\_FFX(k-1)$$

The output matrix update for each corresponding model:

$$C\_M(k) = C\_M(k) + (RLS\_ALPHA * P(k) * L\_M(k)/(RLS\_LAMBDA + \_M(k)^T * P(k) * L\_M(k))) * MODEL\_ERROR$$

$$C\_M\_FFX(k) = C\_M\_FFX(k) + (RLS\_ALPHA * P\_FFX(k) * L\_M\_FFX(k)/(RLS\_LAMBDA + L\_M\_FFX(k)^T * P\_FFX(k) * L\_M\_FFX(k))) * MODEL\_ERROR$$

Note: When CV(k) is constant and equal to CV_SS that will generate no update for the state L_M(k) which at its own turn will generate no update for C_M(k), similar situation is encountered when FFX(k) is constant and equal to FFX_SS (i.e. L_M_FFX(k) and C_M_FFX(k) will be unmodified).

EXAMPLE

The invention was tested on a chemical batch reactor used to produce various polyester compounds. The process involves combining the reagents and then applying heat to the mixture in order to control the reactions and the resulting products. A specific temperature profile sequence for the batch reaction must be followed to ensure that the exothermic reactions occur in a controlled fashion, to avoid explosion and ensure that the resulting products have consistent properties. Also, the reaction rates must be controlled to limit the production of waste gases.

Figure 2:
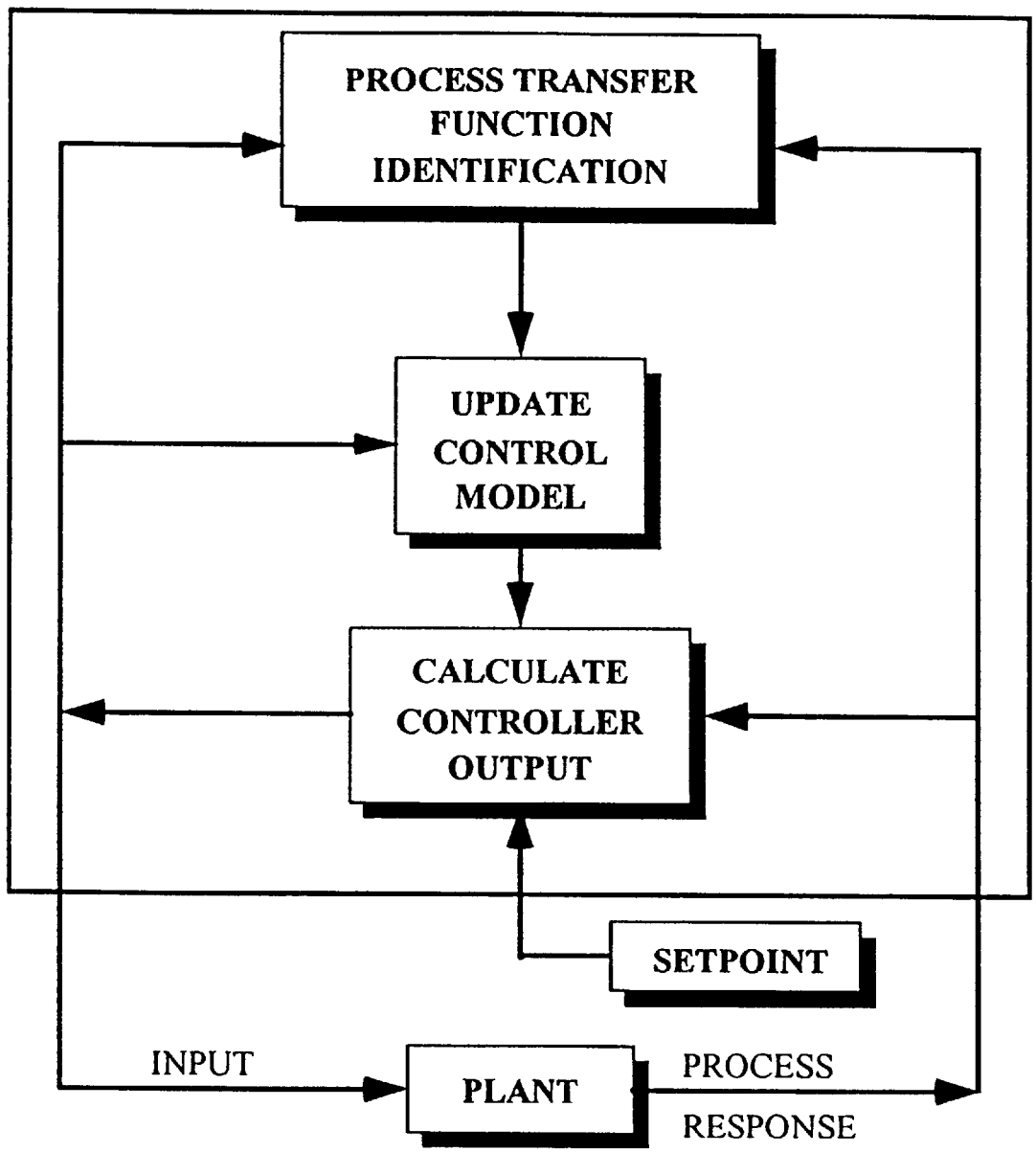
FIG. 2 is a flow chart illustrating the operation of an adaptive controller as applied to a batch reactor in a closed loop system according to the invention.
Figure 3:
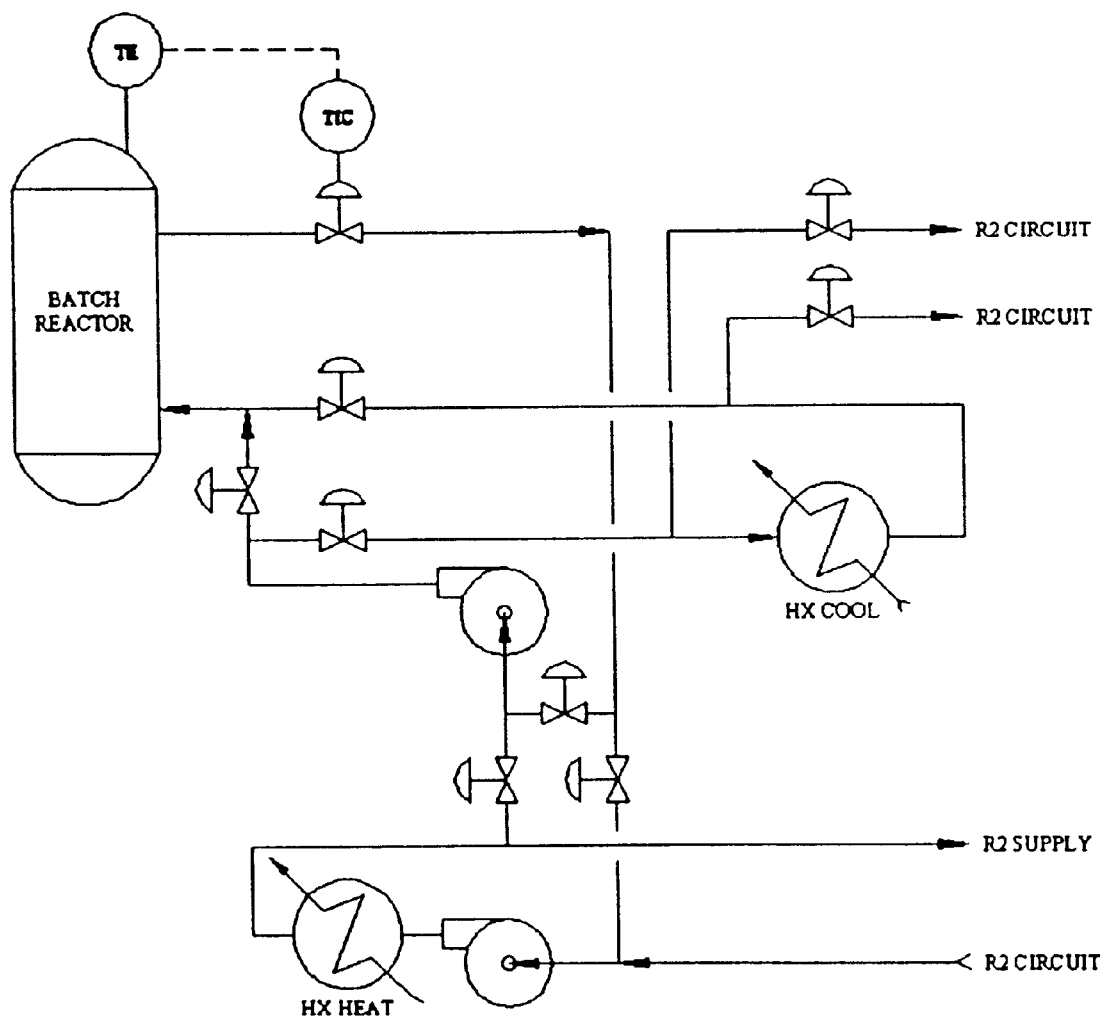
FIG. 3 is a simplified schematic diagram illustrating a batch reactor system.

FIGS. 2 and 3 illustrate a simplified schematic of the system. The reactor operates in a temperature range between 70 and 220 degrees C. and is heated by circulating a fluid (DowTherm-G) through coils on the outside of the reactor. This fluid is in turn heated by a natural gas burner to a temperature in the range of 500 degrees C. The reactor temperature control loop monitors temperature inside the reactor and manipulates the flow of the heating fluid to the reactor jacket. Increasing the flow increases heat transfer to the reactor. Cooling can be done by closing the valves on the heat circuit and recirculating the heating fluid through a second heat exchanger. Cooling is generally only done when the batch is complete to facilitate handling. The reactor temperature is stable only if the heat input to the reactor equals the heat losses. If the flow of heating fluid is set slightly higher than the equilibrium point, the reactor temperature will rise at a constant rate until temperature limits are exceeded. The equilibrium point changes during the batch due to heat produced by the exothermic reactions and the production of vapours, which reduces the reactor temperature. Little heat input is required during the final phase of the batch when vapour production falls to zero.

The plant attempted to automate control of the reactor temperature using a PID controller, but the reactor temperature is difficult to control because of the long dead time (about 8 minutes) and long time constant (about 18 minutes) associated with heating the reactor from the outside. Also the system behaves as an integrator due to the accumulation of heat in the reactor and is therefore only marginally stable in open loop. PID controllers are not well suited for systems with these response characteristics.

Figure 4:
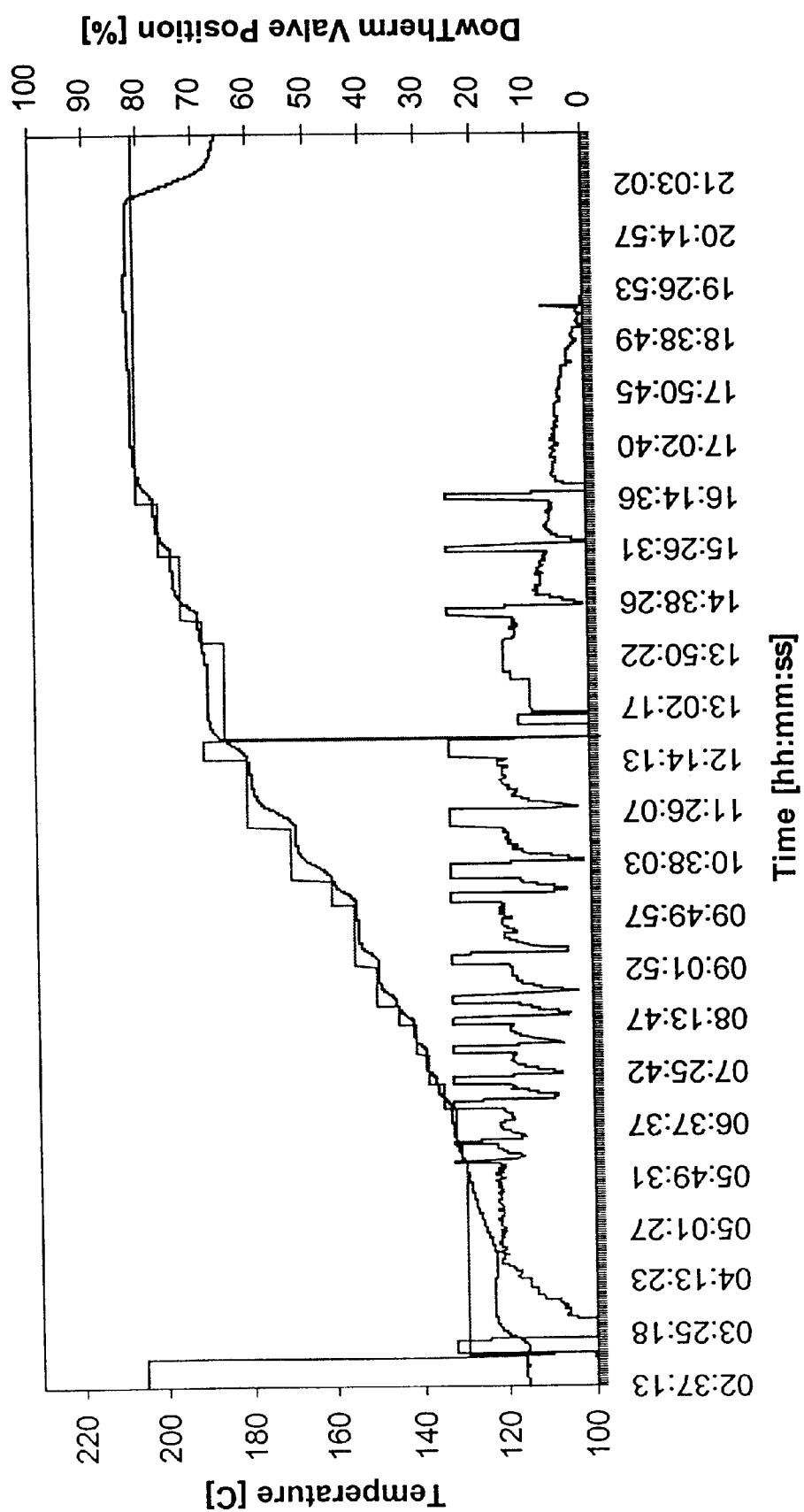
FIG. 4 is a chart illustrating the temperature control performance of an adaptive controller according to the invention on a batch reactor.

A controller according to the invention was implemented on the reactor temperature control loop. The controller parameters were estimated from the observed system response from a previous batch and an appropriate model of the system was developed in the controller using an open loop system representation based on a Laguerre series representation. The control performance was found to be good. A chart of the temperature control performance of the invention during an entire batch is shown in FIG. 4. The integrating type response of the reactor is apparent from the control actions made by the controller as the reactor temperature follows the set point to higher temperature operating points with a final control output at 0%. [The batch sequence was suspended and the controller was placed in manual mode for a short time due to a water supply problem at the plant at 12:30:00. The batch sequence was later resumed and the controller was placed in automatic for the rest of the batch at 14:30:00.]

The controller in this example was implemented in C++ and run on the WINDOWS-NT™ operating system. An OLE for process control (called OPC server) was used to communicate to the Distributed Control System (DCS). Logic was programmed in the DCS device to allow operation from the existing operator console. The operator could select between manual, PID (DCS) or advanced control modes.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. In a method of controlling a marginally stable industrial process comprising the steps of 1) setting an initial state vector; 2) setting an initial parameter vector; 3) setting an initial prediction parameter gain; 4) set the initial covariance matrix; 5) performing a state update 6) estimating the model error, 7) updating the parameter vector, 8) updating the co-variance matrix, and 9) updating the controller output, the improvement comprising the steps of:
   a) Reading the process input, process output, process measured disturbance and the set point at the previous sample tine;
   b) Scaling the process input, process output, process measured disturbance to internal variables corresponding for process input, process output and process measured disturbances, respectively;
   c) When the controller is just enabled or a reset flag is raised ten Reading the tuning parameters from the configuration file;
   d) Computing a state space form of the orthonormal Laguerre network A, B, C(k), A_FFX, B_FFX, C_FFX(k), A_STS, B_STS, C_STS(k)
      where C(k), C_FFX(k), C_STS(k) are calculated from one of the following:
         loaded from a previously saved model;
         loaded from an initial model;
         initialised to [0,0,0, . . . 0]
   e) Computing control related matrices SB, SA, SS, K, SB_FFX, SA_FFX, SS_FFX, K_FFX, SB_STS, SA_STS SS_STS, K_STS;
   f) Initializing C_M(k) with C(k), C_M_STS(k) with C_STS(k) and C_M_FFX(k) with C_FFX(k);
   g) Clearing the state vector L(k), L_FFX(k), L_STS(k) used during control; and
   h) Updating the models states as follows:

$$L(k) = A * L(k-1) + B * CV(k-1)$$
   $$L\_FFX(k) = A\_FFX * L\_FFX(k-1) + B\_FFX * FFX(k-1)$$
   $$L\_STS(k) = A\_STS * L\_STS(k-1) + B\_STS * DV(k-1)$$

where A, A_FFX, A_STS represent the state and B, B_FFX, B_STS the input matrices of the corresponding state space representation of the Laguerre networks generated for the same pole but different number of filters, if required;

i) Calculating the models output estimation:

$$Y\_EST(k) = Y\_EST(k-1) + C(k) * L(k)$$
   $$Y\_EST\_FFX(k) = Y\_EST\_FFX(k-1) + C\_FFX(k) * L\_FFX(k)$$
   $$Y\_EST\_STS(k) = Y\_EST\_STS(k-1) + C\_STS(k) * L\_STS(k)$$

j) Updating the input of the unknown disturbance model:

$$DV(k)=(Y\_EST(k)+Y\_EST\_FFX(k)+Y\_EST\_STS(k))-PV(k);$$

k) Repeating steps h. to j. a plurality of times for the convergence of the state estimators;
   l) Iterate the computation of the input to the unknown disturbance model also for convergence purposes;
   m) Computation of the prediction parameter gain: BETA (k) C(k)*SB(k).

2. The method of claim 1 wherein the model states are updated as follows:

$$L(k) = A * L(k-1) + B * CV(k-1)$$
$$L\_FFX(k) = A\_FFX * L\_FFX(k-1) + B\_FFX * FFX(k-1)$$
$$L\_STS(k) = A\_STS * L\_STS(k-1) + B\_STS * DV(k-1)$$

where A, A_FFX, A_STS represent the state and B, B_FFX, B_STS the input matrices of the corresponding state space representation of the Laguerre networks generated for the same pole but different number of filters if required.

3. The method of claim 1 comprising the further step of producing an accurate plant model based on Laguerre orthonormal basis functions identification, comprising the steps of:
   a) Checking for the pair of inputs for the plant model and known disturbance models as well as the output that characterize the plant equilibrium around a given setpoint;
   b) employing a least square algorithm based on past and current data PV(k−15),PV(k−14), . . . ,PV(k) to estimate the slope (SLOPE(k)) of the process variable;
   c) based on this estimate while SLOPE(k) it is greater then SLOPE_LIMIT then the controller postponing the plant identification until this condition is met;
   d) CV_SS, FFX_SS being considered as the equilibrium inputs to the plant and known disturbance models, respectively, at the moment when learning was started;
   e) updating the state estimate for the plant and known disturbance models, respectively, as:

$$L\_M(k) = A * L\_M(k-1) + B * (CV(k-1) - CV\_SS)$$
   $$L\_M\_FFX(k) = A\_FFX * L\_M\_FFX(k-1) +$$
   $$B\_FFX * (FFX(k-1) - FFX\_SS)$$

f) calculating the MODEL_ERROR as follows:

$$PREDICTED\_DELTA\_PV(k) = C\_M(k-1) * L\_M(k) +$$
$$C\_M\_FFX(k-1) * L\_M\_FFX(k) + C\_M\_STS(k-1) * L\_M\_STS(k)$$
$$ACTUAL\_DELTA\_PV(k) = PV(k) - PV(k-1)$$
$$MODEL\_ERROR(k) =$$
$$ACTUAL\_DELTA\_PV(k) - PREDICTED\_DELTA\_PV(k)$$

g) updating the covariance matrix update P(k) and P_FFX(k) for the plant and known disturbance models, respectively:

$$P(k) = P(k-1)/RLS\_LAMBDA - (RLS\_ALPHA * P(k-1) * L\_M(k)) * L\_M(k)^T * P(k-1))/(RLS\_LAMBDA * (RLS\_LAMBDA + L\_M(k)^T * P(k-1) * L\_M(k))) + RLS\_BETA * I + RLS\_DELTA * P(k-1) * P(k-1)$$

$$P\_FFX(k) = P\_FFX(k-1)/RLS\_LAMBDA - (RLS\_ALPHA * P\_FFX(k-1) * L\_M\_FFX(k)) * L\_M\_FFX(k)^T * P\_FFX(k-1))/(RLS\_LAMBDA * (RLS\_LAMBDA + L\_M\_FFX(k)^T * P\_FFX(k-1) * L\_M\_FFX(k))) + RLS\_BETA * I + RLS\_DELTA * P\_FFX(k-1) * P\_FFX(k-1)$$

h) updating the output matrix for each corresponding model:

$$C\_M(k) = C\_M(k) + (RLS\_ALPHA * P(k) * L\_M(k)/(RLS\_LAMBDA + \_M(k)^T * P(k) * L\_M(k)) * MODEL\_ERROR$$

$$C\_M\_FFX(k) = C\_M\_FFX(k) + (RLS\_ALPHA * P\_FFX(k) * L\_M\_FFX(k)/(RLS\_LAMBDA + L\_M\_FFX(k)^T * P\_FFX(k) * L\_M\_FFX(k)) * MODEL\_ERROR.$$

4. The method of claim 2 wherein the model output estimations are recalculated as follows:

$$Y\_EST(k) = Y\_EST(k-1) + C(k) * L(k)$$
$$Y\_EST\_FFX(k) = Y\_EST\_FFX(k-1) + C\_FFX(k) * L\_FFX(k)$$
$$Y\_EST\_STS(k) = Y\_EST\_STS(k-1) + C\_STS(k) * L\_STS(k).$$

5. The method of claim 4 wherein the input of the unknown disturbance model is updated based on the following formula:

$$DV(k) = (Y\_EST(k) + Y\_EST\_FFX(k) + Y\_EST\_STS(k)) - PV(k).$$

6. The method of claim 5 wherein BETA(k)=C(k)*SB(k).

7. The method of claim 6 wherein the set point is filtered into a reference using the following digital filter:

$$Y\_R(k) = (1 - 0.01 * SP\_FILTER) * Y\_R(k-1) + 0.01 * SP\_FILTER * SET\_POINT(k).$$

8. The method of claim 7 wherein CV(k) is calculated as:

$$CV(k) = BETA(k)^{-1} * (Y\_R(k) - PV(k) - (C(k) * SA * L(k)) - (C\_STS(k) * SS * DV(k) + C\_STS(k) * SA\_STS * L\_STS(k)) - (C\_FFX(k) * SS * DV(k) + C\_FFX(k) * SA\_FFX * L\_FFX(k)).$$

9. The method of claim 8 wherein the following integrator is used $$INT\_SUM(k) = INT\_SUM(k-1) + DIST\_FILTER\_PAR * INT\_GAIN * (Y\_R(k) - PV(k))$$

$$DIST\_FILTER\_PAR = ((DIST\_FILTER\_LENGTH - SUM\_CANCEL\_COUNTER)/DIST\_FILTER\_LENGTH)^5$$

and $CV(k) = CV(k) + INT\_SUM(k).$

10. The method of claim 9 wherein the scaling of controller internal variable CV(k) into controller output CV_PROCESS(k) involves a reverse computation:

$$CV\_PROCESS(k) = (CV(k)/LEARNING\_RATE/CV\_NORMALIZATION) * CV\_RANGE\_MAX\_RAW - CV\_RANGE\_MIN\_RAW) + CV\_RANGE\_MIN\_RAW$$

based on the following scaling factors:
LEARNING_RATE
CV_NORMALIZATION
CV_RANGE_MAX_RAW
CV_RANGE_MIN_RAW
CV_RANGE_MIN_RAW.

11. The method of claim 10 wherein said scaling of the process input (CV_PROCESS(k)), process output (PV_PROCESS(k)), process measured disturbance (FFX_PROCESS(k)) to internal variables corresponding for process input (CV(k)), process output (PV(k)) and process measured disturbances (FFX(k)), respectively is done by the following sub-procedure:

```
BWC_INTERNAL_GAIN = 0.06
Read the LEARNING_RATE
Read the PLANT_GAIN
DECISION_VARIABLE = PLANT_GAIN/BWC_INTERNAL_GAIN
If DECISION_VARIABLE > 1 then
        CV_NORMALIZATION = PLANT_GAIN/
                           BWC_INTERNAL_GAIN
        PV_NORMALIZATION = 1
Else
        PV_NORMALIZATION = PLANT_GAIN/
                           BWC_INTERNAL_GAIN
        CV_NORMALIZATION = 1
Read CV_RANGE_MAX_RAW, CV_RANGE_MIN_RAW
CV(k) = LEARNING_RATE*CV_NORMALIZATION*
        (CV_PROCESS(k) - CV_RANGE_MIN_RAW)/
        (CV_RANGE_MAX_RAW - CV_RANGE_MIN_RAW)
PV(k) = LEARNING_RATE*PV_NORMALIZATION*
        (PV_PROCESS(k) - PV_RANGE_MIN_RAW)/
        (PV_RANGE_MAX_RAW - PV_RANGE_MIN_RAW)
FFX(k) = LEARNING_RATE*FFX_NORMALIZATION*
        (FFX_PROCESS(k) - FFX_RANGE_MIN_RAW)/
        (FFX_RANGE_MAX_RAW -
        FFX_RANGE_MIN_RAW)
Procedure return.
```

12. The method of claim 11 wherein when the controller is just enabled or reset flag is raised then the following tuning parameters are read from the configuration file:

| | | |
|---|---|---|
| MIN_BETA | 0.001 | Minimum Beta - Used for model reloading |
| SP_FILTER | 100 | SP Filtering in (Range 0–100, 100–No filtering) |
| INT_GAIN | 0.02 | Sum Cancel parameter (default 1.0 for Int.Process) |
| RLS_LAMBDA | 0.99 | RlsLambda - Recursive Least Square Parameter |
| RLS_ALPHA | 0.5 | RlsAlpha - Recursive Least Square Parameter |
| RLS_BETA | 0.005 | RlsBeta - Recursive Least Square Parameter |
| RLS_DELTA | 0.005 | RlsDelta - Recursive Least Square Parameter |
| PK_DIAG | 10 | Initial PK covariance matrix, with a diagonal structure |
| INTEG_LEARN_FACTOR | 1 | Integrating Learning Factor (1–20) |
| SLOPE_LIMIT | 0.05 | Steady State Slope Limit |
| SUM_CANCEL_COUNTER | 30 | Number of updates after the set-point change has occurred |
| DIST_FILTER_LENGTH | 50 | Number of samples used within the filter. |

\* \* \* \* \*

UNITED STATES PATENT AND TRADEMARK OFFICE
CERTIFICATE OF CORRECTION

PATENT NO. : 6,643,554 B2  Page 1 of 1
DATED : November 4, 2003
INVENTOR(S) : Gough, Jr. et al.

It is certified that error appears in the above-identified patent and that said Letters Patent is hereby corrected as shown below:

Column 3,
Line 5, delete in its entirety.
Line 40, change "$K_{ff}$" to -- $k_{ff}$ --.

Column 6,
Line 15, change "+ SA" to -- * SA --.
Line 50, after "CV_NORMALIZATION)" change "*" to -- * --.

Column 9,
Line 36, change "tine" to -- time --.
Line 42, change "ten" to -- then --.

Column 10,
Line 19, after "(k)", first occurrence, insert -- = --.

Signed and Sealed this

Ninth Day of November, 2004

JON W. DUDAS
*Director of the United States Patent and Trademark Office*